Feb. 14, 1956 P. J. McCULLOUGH 2,734,448
BREAD TOASTER
Filed Aug. 6, 1951 2 Sheets-Sheet 1

Inventor
Paul J. McCullough
By Rodney Bedell
atty.

Feb. 14, 1956 P. J. McCULLOUGH 2,734,448
BREAD TOASTER
Filed Aug. 6, 1951 2 Sheets-Sheet 2
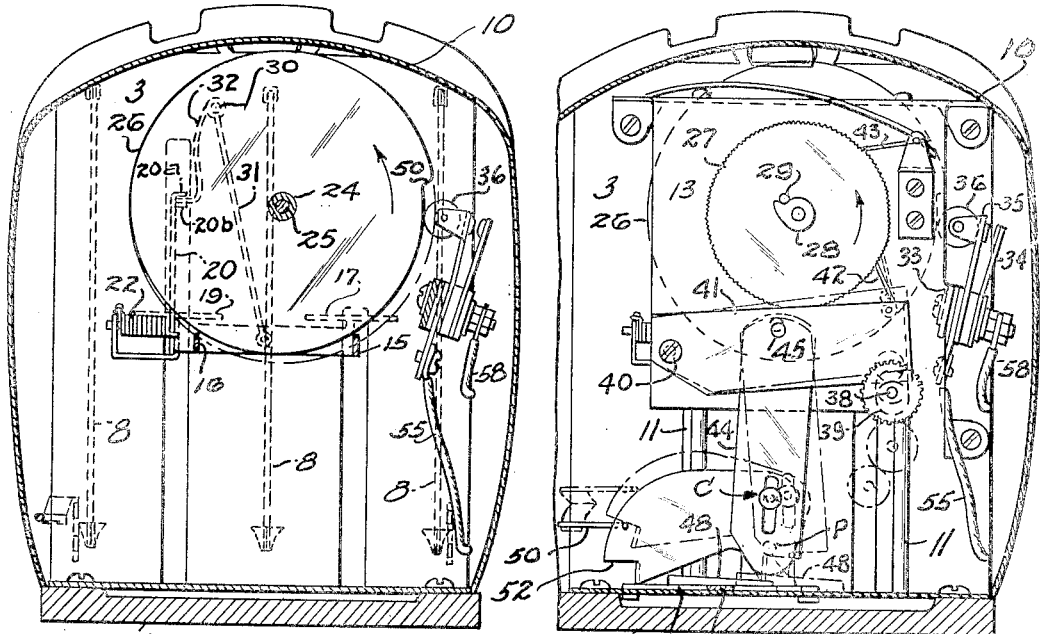
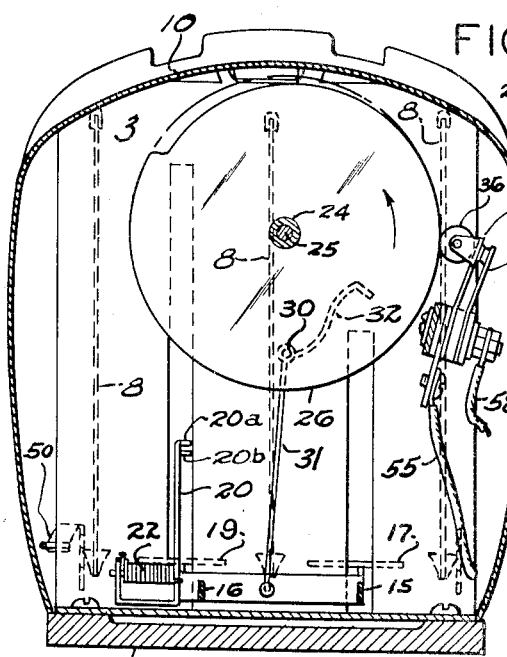
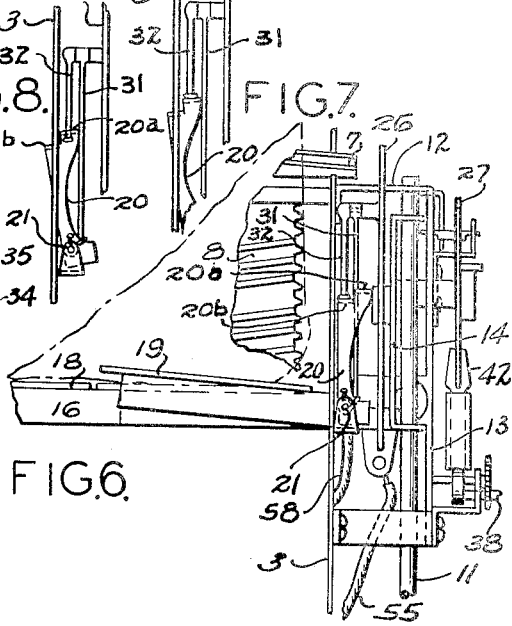
Inventor
Paul J. McCullough
by Rodney Bedell
atty.

United States Patent Office 2,734,448
Patented Feb. 14, 1956

2,734,448
BREAD TOASTER

Paul J. McCullough, St. Louis, Mo., assignor to The Toastswell Company, Inc., St. Louis, Mo., a corporation of Missouri Application August 6, 1951, Serial No. 240,495

8 Claims. (Cl. 99—328)

The invention relates to electric bread toasters such as are common in domestic use.

One object of the invention is to provide a bread carrier which automatically moves downwardly from a normal raised position when a slice of bread is placed thereon and after a predetermined period elevates the slice to a position in which its upper edge may be grasped by the fingers and removed from the toaster. Preferably the return of the slice from a lowered to a raised position is effected slowly during the toasting operation so as to more evenly brown the toast by moving it alongside of the heating element.

Another object is to eliminate clockwork and clock springs for a timing operation and to heat the toaster elements and time the toasting operation by a simple electric motor having a circuit which is closed the instant the slice is placed in the toaster and is opened as the carrier and slice thereon reaches fully raised position, and the toasting operation completed. The closing of the heating and motor circuits is effected solely by the placing of the slice in the toaster.

Another object is to vary the period required for a toasting operation either manually, according to a manual setting of the motor driven mechanism, or automatically by a thermostat which controls the motor driven mechanism.

These and other detail objects are attained by the structure illustrated in the accompanying drawings, in which:

Figures 3 and 4 are vertical transverse sections taken on the corresponding section lines of Figure 1.

Figure 5 corresponds to Figure 3 but shows the parts in a different position.

Figure 1:
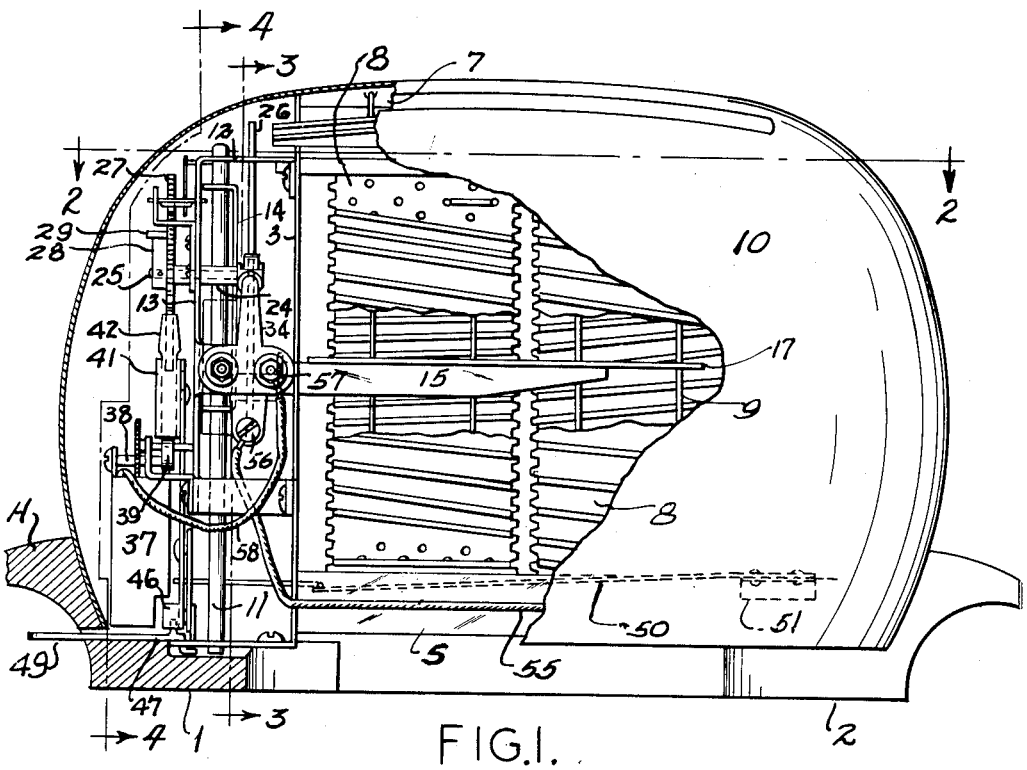
Figure 1 is in part a side view of a complete toaster and in part is a longitudinal vertical section taken upon the line 1—1 of Figure 2.

Figure 6 is a side view of the operating mechanism and associated parts looking at the same from the side opposite to that shown in Figure 1.

Figure 7 is a similar side view showing some of the parts moved to a different position assumed at the end of a toasting operation.

Figure 8 is a similar side view showing the parts moved to another position assumed when a fresh slice is deposited upon the slice carrier.

The toaster includes a frame having base members 1, 2, deep upright ends 3, 4, connected by shallow sides 5, 6 and top bars 7, heating elements 8, comprising sheets of mica with resistant wires wound thereon and mounted on sides 5, 6, and bars 7. Guard wires 9 are similarly mounted. A box-like housing or casing 10 is fixed to the base and encloses the rest of the parts and with heating elements 8 forms the slice-receiving heating compartments. The above described structure is commonly used and in itself does not constitute the present invention.

Spaced from end 3 and spaced from each other transversely of the toaster are a pair of rod standards 11 with their lower ends mounted on base 1. A bracket 12 on the upper portion of end 3 receives the upper ends of rods 11 and extends downwardly alongside the rods at 13 to mount the driving mechanism.

Figure 2:
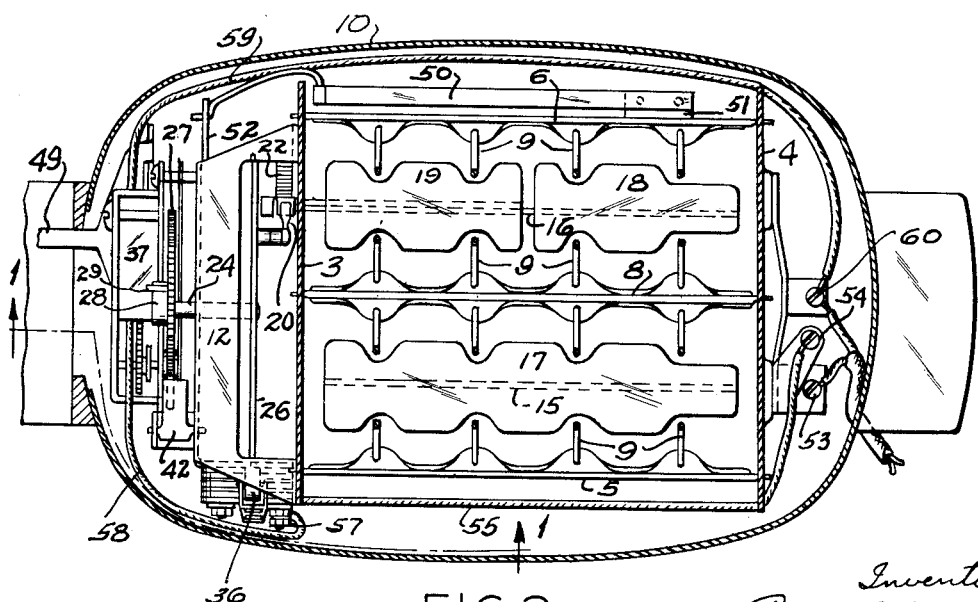
Figure 2 is a horizontal section taken approximately on the line 2—2 of Figure 1.

A slice carrier includes an upright plate 14 positioned between plates 3 and 13 with its upper and lower edges flanged horizontally and apertured to receive rods 11 so that plate 14 may slide vertically on the rods. Bars 15, 16 extend horizontally from plate 14 through slots in plate 3 into the toasting compartments between heating elements 8. Bar 15 is provided with an elongated sheet metal relatively rigid shelf 17. Bar 16 is provided with a relatively short sheet metal relatively rigid shelf 18 and with a shelf section 19, pivoted to the carrier at 21 (Figure 6) and having an upright arm 20. Elements 19, 20 form a bell crank. A torsion coil spring 22 (Figures 2, 3) anchored to bracket 12 thrusts the bell crank in a clockwise direction to the position shown in Figure 6. The upper end of arm 20 is forked and includes an upper terminal flange 20a and a lower terminal flange 20b. Arm 20 terminates in two flanges 20a and 20b at different levels.

When a bread slice is placed on shelf 18, 19, its weight on section 19 will tilt the bell crank in an anti-clockwise direction to the position shown in Figure 8.

Journaled on bracket 13 is a tube 24 (Figures 1, 2, 3, 5) which in turn journals a shaft 25 (Figure 3, 5). Fixed on the inner end of shaft 25 is a disc 26 (Figures 3, 5), the edge of which forms a switch control cam. Fixed on the outer end of tube 24 is a ratchet wheel 27. The outer end of shaft 25 projects beyond ratchet 27 (Figures 1, 4) and the end of tube 24 and has a crank 28 fixed thereon and disposed to engage a pin 29 on ratchet 27.

A link 31 (Figures 3, 5) is pivoted at its upper end to pin 30 on disc 26 and at its lower end to the carrier plate 14. A stop finger 32 is fixed to pin 30 and the outer end of finger 32 engages upper terminal flange 20a as the disc approaches, but before it reaches, the position shown in Figure 3. This stops the rotation of the disc. When shelf section 19 is unloaded, spring 22 is free to rotate the bell crank arm to the position shown in Figures 3, 6, in which the outer end of finger 32 engages lower terminal flange 20b. Upon the subsequent application of a slice to shelf section 19, the bell crank is rotated in an anti-clockwise direction to the position shown in Figure 8 and the lower terminal flange 20b slides out from under the end of finger 32, permitting disc 26 under the load on link 31 to rotate to the position shown in Figure 5 in which the slice carrier shelves are at the bottom of the toasting compartments.

A bracket 33 on the right hand edge of plate 13 mounts a pair of switch arms 34, 35, arm 35 being of spring material tending to assume the position shown in Figure 4 and carrying a roller 36 opposite to the edge of disc 26. When disc 26 is in the position shown in Figure 5, its edge cams roller 36 and switch arm 35 to the position shown in Figure 5, which completes the toaster circuit.

A simple electric motor 37 includes a reduction gearing terminating in a shaft 38 (Figure 4), carrying an eccentric 39. Pivoted at 40 to the left hand portion of plate 13 is a lever 41 extending over eccentric 39. The right hand end of lever 41 carries a spring pawl 42 engaging the teeth of ratchet 27. Rotation of shaft 38 causes the eccentric to raise lever 41 so that its pawl 42 feeds ratchet 27 in an anti-clockwise direction. Lever 41 drops by gravity as the eccentric rotates from its high position. A check pawl 43 holds ratchet 27 against return movement.

*Operation.*—When shelf 18, 19 is loaded, bell crank arm 20 is tripped to release finger 32 from the position shown in Figures 3, 6 and disc 26 is rotated quickly to the position shown in Figure 5, the switch is closed and heating elements 8 and motor 37 are energized. Eccentric 39 is rotated and reciprocates pawl 42, rotating ratchet wheel 27 little by little until pin 29 engages crank 28. (The lost motion between elements 28 and 29 permits initial heating of the slice without movement of the same.) When pivot 30 passes over its highest point, the weight of the loaded carrier will cause finger 32 to drop to the position shown in Figure 7 and during this drop the quick rotation of the disc will open the switch quickly as cam element 50 releases the switch roller 36 (Figure 3).

This terminates the toasting operation and the toast is held in projected position until removed. Upon removal of the toast, spring 22 rotates the bell crank to the position shown in Figure 6 and the outer end of finger 32 is shifted to the lower bell crank flange 20b, retaining the carrier in elevated position until shelf section 19 is depressed by another slice of bread to release finger 32 as previously described.

The timing of a toasting operation depends upon the travel of lever 41 with each rotation of eccentric 39. This is determined by a bar 44 (Figure 4) pivoted at 45 to lever 41 and extending downwardly therefrom with a lip 46 (Figure 1) at its lower end overlying a slide 47 (Figure 4) having an inclined upwardly facing edge 48. The slide may be shifted between the solid line and dotted line position shown in Figure 4 by manually engaging an extension 49 on the slide projecting beyond the casing preferably beneath a handle H on base 1.

When slide 47 is moved to the left (Figure 4), each rotation of eccentric 39 lifts the end of lever 41 the full extent of the throw of the eccentric and when the lever is lowered, its pawl 42 rides over a maximum number of teeth on ratchet wheel 27 and the ratchet and disc 27 are fed relatively rapidly. When slide 47 is moved to the right (Figure 4) bar 44 elevates lever 41 so that it is engaged by the eccentric only during the higher part of the eccentric throw and the travel of pawl 42 is less for each rotation of the eccentric, hence the ratchet and disc are fed relatively slower resulting in a longer time for the toasting operation.

To compensate automatically for the difference in toasting time required when the toaster is cold and the time required when the toaster has been heated up after several successive toasting operations (and thus produce even toasting without resetting by the user), there is provided a thermostat 50 (Figures 1, 2, 4) paralleling toaster side 6 and fixed at one end on a side bracket 51. The opposite movable end of the thermostat engages a lever 52 pivoted at P (Figure 4) to the frame and having a pin and slot lost motion connection C to bar 44. As the thermostat is heated, its free end rises from the lower position shown in Figures 1 and 4 towards the higher position and in so doing, it tilts lever 52 and shifts bar 44 from the solid line position shown in Figure 4 towards the broken line position with its lip 46 over the shallower part of slide edge 48 permitting bar 44 to drop a greater distance with each rotation of eccentric 39 and speeding up the rotation of ratchet wheel 27 and shortening the toasting period similar to the manual shifting of slide 47 to the left.

As previously indicated, the motor is in series with the heating elements, the energizing circuit leading from the high potential post 53 through on the heating elements 8 to a terminal 54 and hence by a wire 55 to a motor switch terminal 56. The other switch terminal 57 is connected by a wire 58 to the motor 37. A wire 59 leads from the motor to the low potential post 60.

The mechanism is simple and the toaster is automatically controlled solely by the insertion and removal of a slice from the carrier 18, 19. The toasting operation is timed by a free running motor under constant load which is started when a toast slice is placed upon the carrier and is stopped when the toasting operation is finished. Nevertheless, at the beginning of a toasting operation, the slice remains stationary at the lowermost portion of a toasting chamber for a predetermined period and is then raised slowly and at the end of a toasting operation, the motor is stopped and the heating circuit is opened with the toast slice projecting from the carrier. It is unnecessary for the user to energize a timing mechanism by depressing a lever and the toasting period will not be affected by variations in manual setting of a timing mechanism.

The details of the structure may be varied without departing from the spirit of the invention and the exclusive use of those modifications coming within the scope of the claims is contemplated.

What is claimed is:

1. In a bread toaster, a heating compartment, an electric resistance heating element therefor, there being a frame at one end of said compartment, a device slidable vertically on the frame, a slice carrier extending substantially horizontally from said device and movable therewith and tiltable vertically thereon, a disc journaled on the frame and having a pin and link connection to said device, an electric motor, a circuit therefor including a switch, a lost motion driving connection between said motor and disc, whereby said motor and disc raises said device from a low position to a high position, said device being movable by gravity from the high position to the low position, said disc including a cam which, during its initial downward movement, opens said switch, stops on said device and said disc interengageable during the initial downward movement of said device to arrest the movement of the disc and device following the opening of said switch, and a connection between said slice carrier and one of said stops for disengaging the stops when the carrier is tilted downwardly by the deposit of a bread slice thereon.

2. In a bread toaster, an upright, a bread carrier slidable vertically thereon and having a section which may be tilted relative to the remainder of the carrier by the weight of a bread slice placed on the section, a vertically disposed disc journaled in the frame, a link supporting the carrier from a point on the disc spaced radially of its journal, a heating element, an electric motor operatively connected to the disc, a switch for the motor circuit controlled by the disc, a stop member on the disc, a stop member pivoted on the carrier having stop elements at different levels, said disc stop member cooperating with either of said carrier stop elements to limit the rotation of the disc, the stop member on the carrier being shiftable by the tilting section to position the lower carrier stop element in the path of movement of the disc stop member when the section is unloaded and to position the higher carrier stop element in the path of the disc stop member when said carrier section is tilted downwardly by a bread slice placed thereon.

3. In a bread toaster, an electric circuit, a switch in said circuit, a motor energized when said switch is closed, a device rotatable about a horizontal axis by said motor and having a portion elevated and lowered as the device is rotated, a slice carrier supported from said portion and raised and lowered therewith, an overrunning clutch between said motor and said device providing for the rotation of said device by said motor to elevate said portion and providing for the rotation of said device by gravity as said portion passes its highest position, a latch movable with said device, a stationary stop in the path of said latch during the gravity induced rotation of said device, a slice-contacting member on said slice carrier and movable thereon by the deposit of slice on the carrier to disengage said latch from said stop and thereby free said device to drop further by gravity, a connection between said part and said switch to close the latter as said part nears its lowermost position.

4. A bread toaster according to claim 3 which includes electric resistance elements in the same circuit as the motor and energized by the closing of the single switch specified in claim 3.

5. A bread toaster according to claim 3 in which the switch includes a spring blade thrusting the switch into closing position and the rotatable device comprises an upright disc the periphery of which forms a cam having a projecting switch-control element engaging and distorting the switch spring blade during initial gravity-induced movement of the rotatable device disc and freeing the switch spring blade during subsequent gravity-induced movement of the rotatable device disc.

6. A toaster according to claim 3 in which a ratchet wheel, an associated pawl and a pawl-oscillating eccentric rotated by the motor shaft comprises the overrunning clutch between the motor and the rotatable device, there being manually adjustable means for determining the throw of the pawl with each rotation of the eccentric and thereby varying the time period of the toaster operation.

7. In a bread toaster frame, an electric circuit, a switch therefor, an electric motor energized by the closing of said circuit, a slice carrier, an operative connection between the motor and carrier for raising the latter to an elevated position when the switch is closed and the circuit is energized, said carrier being lowered by gravity upon continued rotation of the motor and movement of said connection after said carrier reaches said elevated position, interengaging members on the toaster frame and said connection limiting the gravity actuated lowering of the carrier, an element on the carrier engageable by a slice deposited thereon to disengage said members and free said connection for further gravity induced movement of the carrier, and a device actuated by said connection for respectively opening and closing said circuit switch during initial and subsequent gravity induced movement of the carrier.

8. In a toaster, an electrical circuit including an electric motor, heating means and a switch for energizing the heating means and the motor, a vertically movable slice carrier mounted within the toaster, stop means connected to said carrier for maintaining the same in an initial position intermediate its uppermost and lowermost positions, said carrier including means actuated by a slice placed thereon for releasing said stop means and permitting the carrier to move downwardly to its lowermost position, means connected to said slice carrier for closing said switch when the carrier is moved from its initial to its lowermost position under the influence of a slice placed thereon, means driven by said motor and connected to the last mentioned means to elevate said carrier, the last means including a one-way clutch permitting the carrier to override the motor drive when the carrier has reached its upper position and fall under the influence of the slice resting thereon to the initial position with the toasted slice projecting from the toaster.

References Cited in the file of this patent

UNITED STATES PATENTS

| | | |
|---|---|---|
| 1,944,473 | Starr | Jan. 23, 1934 |
| 2,046,472 | Lavenburg | July 7, 1936 |
| 2,151,695 | Goddard | Mar. 28, 1939 |
| 2,194,859 | Malmquist et al. | Mar. 26, 1940 |
| 2,285,231 | Scharf | June 2, 1942 |
| 2,288,713 | Ireland | July 7, 1942 |
| 2,336,695 | McCullough | Dec. 14, 1943 |
| 2,347,385 | Wright et al. | Apr. 25, 1944 |
| 2,347,611 | Purpura | Apr. 25, 1944 |
| 2,361,446 | Anderson | Oct. 31, 1944 |
| 2,378,073 | Felver et al. | June 12, 1945 |
| 2,386,009 | Smith | Oct. 2, 1945 |
| 2,402,576 | Purpura | June 25, 1946 |
| 2,515,866 | Fitzgerald | July 18, 1950 |
| 2,532,569 | Poole et al. | Dec. 5, 1950 |
| 2,644,392 | Foster | July 7, 1953 |